(12) United States Patent
Ambrus et al.

(10) Patent No.: US 11,487,467 B1
(45) Date of Patent: Nov. 1, 2022

(54) LAYERED MEMORY MAPPED FILE TECHNOLOGY

(71) Applicant: Microsoft Technology Licensing, LLC, Redmond, WA (US)

(72) Inventors: Anthony James Ambrus, Seattle, WA (US); Logan James Buesching, Carmel, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/334,552

(22) Filed: May 28, 2021

(51) Int. Cl.
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC ..... G06F 3/0655; G06F 3/0604; G06F 3/0673
See application file for complete search history.

(56) References Cited

U.S. PATENT DOCUMENTS

| | | | |
|---|---|---|---|
| 7,257,584 | B2 | 8/2007 | Hirschfeld et al. |
| 8,150,801 | B2 | 4/2012 | Srivastava et al. |
| 8,935,446 | B1 | 1/2015 | Shilane et al. |
| 2006/0069885 | A1 | 3/2006 | Matsui et al. |
| 2013/0073789 | A1* | 3/2013 | Khmelnitsky ........ G06F 3/0604 711/E12.008 |
| 2015/0142748 | A1 | 5/2015 | Gottemukkula et al. |
| 2015/0213092 | A1* | 7/2015 | Goodwin .............. G06F 16/258 707/693 |
| 2019/0087110 | A1* | 3/2019 | Li ...................... G11C 16/3418 |
| 2019/0114095 | A1 | 4/2019 | Green et al. |

FOREIGN PATENT DOCUMENTS

EP  2698732 A1  2/2014

OTHER PUBLICATIONS

"Huawei FusionSphere 5.1", In Technical White Paper of Huawei Technologies Co., Ltd, Jul. 17, 2015, 95 Pages.
(Continued)

*Primary Examiner* — Zhuo H Li
(74) *Attorney, Agent, or Firm* — Workman Nydegger (57) ABSTRACT

Rapid writing to and reading from even very large amounts of data, especially where the data evolves more slowly over time. For each of a sequence of commits of the data, the data is represented by identifying pages of the data that have changed since a prior commit in the sequence of commits. A sparce file is formulate for the commit, and contains each of identified pages, and for each identified page a mapping of the identified to a page address of the identified page in the address range. The sparce file is then stored as associated with the corresponding commit. Thus, an ordered sequence of sparce files can be created and layered on top of a base file that represents the entire page address range. The sparce files may be quite small as there may be relatively few pages (or perhaps even no pages) that changed since the prior commit in the sequence of commits. Reads occur by creating a sparce in-memory object, and checking for each page at each sparce.

20 Claims, 7 Drawing Sheets

(56) References Cited

OTHER PUBLICATIONS

Chou, Yung, "Hyper-V Virtual Hard Disk (VHD) Operations Explained", Retrieved from: https://blogs.technet.microsoft.com/yungchou/2013/01/23/hyper-v-virtual-hard-disk-vhd-operations-explained/, Jan. 23, 2013, 9 Pages.

Walter, Hofstetter, "XenClient—Disk Management—VHD files and chains", Retrieved from: https://web.archive.org/web/20190502191648/https://www.citrix.com/blogs/2011/01/17/xenclient-disk-management-vhd-files-and-chains/, Jan. 17, 2011, 24 Pages.

MacDonald, JoshuaP., "File System Support for Delta Compression", in Masters thesis submitted to Department of Electrical Engineering and Computer Science, University of California, Jan. 1, 2000, 32 Pages.

"International Search Report & Written Opinion Issued in PCT Application No. PCT/US22/027559", dated Aug. 19, 2022, 14 Pages.

\* cited by examiner

LAYERED MEMORY MAPPED FILE TECHNOLOGY

BACKGROUND

Codebases are collections of related code. A dependency graph is often used to track dependencies between related code in the codebase. Sometimes, the codebase can be so massive, that even the dependency graph describing dependencies of the code base is too large to load into memory. Nevertheless, building of the codebase uses information from the dependency graph to be able to efficiently and accurate build.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein permit for rapid writing to and reading from even very large amounts of data, especially where the data evolves more slowly over time. As an example, the data could be a dependency graph of a large codebase or perhaps the weights and biases of a complex neural network. The data evolves from one commit to the next and spans a page address range.

For each of a sequence of commits of the data, the data is represented by identifying pages of the data that have changed since a prior commit in the sequence of commits. A sparce file is formulated for the commit, and contains each of the identified pages, and for each identified page a mapping of the identified page to a page address of the identified page. The sparce file is then stored as associated with the corresponding commit. Thus, an ordered sequence of sparce files can be created and layered on top of a base file that represents the entire page address range. The sparce files may be quite small as there may be relatively few pages (or perhaps even no pages) that changed since the prior commit in the sequence of commits.

Data is read by first formulating an in-memory object that does not initially contain at least most of the pages of the data, but is structured to be interpreted by the reader process as including data of the page address range. As an example, the in-memory object might be completely devoid of any pages at all at first. But yet, the read process sees the in-memory object and can treat the object as if it contains all of the data. Pages are loaded into the in-memory object as the page is read.

As part of the read, the pages that are part of the read are identified. A page read is performed for each of the identified pages. The page read includes obtaining sparce files each corresponding to a respective commit in a sequence of commits of the data. For each of the sparce files, an evaluation is performed in reverse time order beginning at a most recent sparce file representing a most recent commit in the sequence of commits. The evaluation includes determining whether the corresponding sparce file contains the corresponding page, and if it does not, proceeding to the next sparce file to perform the evaluation. If the corresponding sparce file does contain the corresponding page, the page is loaded from the corresponding sparce file into the in-memory object, and read from the loaded page in the in-memory object. If none of the sparce files contained the corresponding page, then the page may then be loaded from a base file.

This reading operation is very fast since the read deals with an initially empty in-memory object, and thereafter sparce files and individual pages from a larger base file. Accordingly, reads take less time, permitting more complex querying that takes multiple reads from the data. Thus, even very large bodies of data can be interfaced with fast and efficiently.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein permit for rapid writing to and reading from even very large amounts of data, especially where the data evolves more slowly over time. As an example, the data could be a dependency graph of a large codebase or perhaps the weights and biases of a complex neural network. The data evolves from one commit to the next and spans a page address range.

For each of a sequence of commits of the data, the data is represented by identifying pages of the data that have changed since a prior commit in the sequence of commits. A sparce file is formulated for the commit, and contains each of the identified pages, and for each identified page a mapping of the identified page to a page address of the identified page. The sparce file is then stored as associated with the corresponding commit. Thus, an ordered sequence of sparce files can be created and layered on top of a base file that represents the entire page address range. The sparce files may be quite small as there may be relatively few pages (or perhaps even no pages) that changed since the prior commit in the sequence of commits.

Data is read by first formulating an in-memory object that does not initially contain at least most of the pages of the data, but is structured to be interpreted by the reader process as including data of the page address range. As an example, the in-memory object might be completely devoid of any pages at all at first. But yet, the read process sees the in-memory object and can treat the object as if it contains all of the data. Pages are loaded into the in-memory object as the page is read.

As part of the read, the pages that are part of the read are identified. A page read is performed for each of the identified pages. The page read includes obtaining sparce files each corresponding to a respective commit in a sequence of commits of the data. For each of the sparce files, an evaluation is performed in reverse time order beginning at a most recent sparce file representing a most recent commit in the sequence of commits. The evaluation includes determining whether the corresponding sparce file contains the corresponding page, and if it does not, proceeding to the next sparce file to perform the evaluation. If the corresponding sparce file does contain the corresponding page, the page is loaded from the corresponding sparce file into the in-memory object, and read from the loaded page in the in-memory object. If none of the sparce files contained the corresponding page, then the page may then be loaded from a base file.

This reading operation is very fast since the read deals with an initially empty in-memory object, and thereafter sparce files and individual pages from a larger base file. Accordingly, reads take less time, permitting more complex querying that takes multiple reads from the data. Thus, even very large bodies of data can be interfaced with fast and efficiently.

Figure 1:
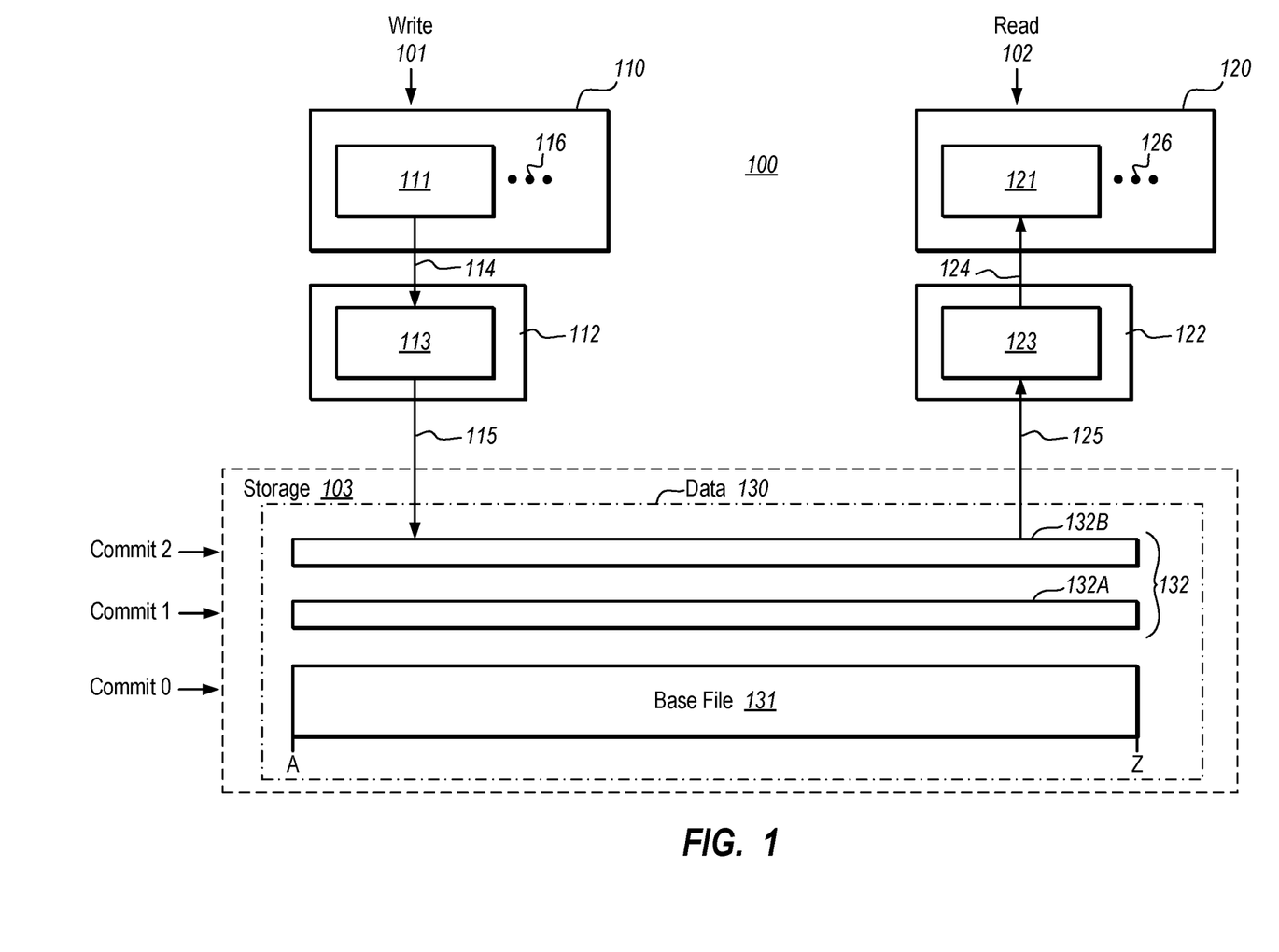
FIG. 1 illustrates an environment in which write processes write to data within storage along a write channel, and in which read processes read from the data within the storage along a read channel, in accordance with the principles described herein.

FIG. 1 illustrates an environment 100 in which write processes 110 write to data 130 within storage 103 along a write channel 101, and in which read processes 120 read from the data 130 within the storage 103 along read channel 102. The data 130 is shown as having a page address range spanning from A to Z. Large pieces of data may have a page address range that includes thousands, millions, or even billions of pages, or even more. The data 130 changes within the storage 103 from one commit to another.

The data 130 includes a based file 131 that includes an entirety of the data in the page address range of the data as it existed at a zero'th commit called herein commit 0. The base file 131 may be quite large, perhaps in the gigabyte range, terabyte range, or even larger.

The data 130 is also represented by the sparce delta files 132. When additional commits happen, sparce delta files 132 are layered upon the base file 131. For example, in FIG. 2, there have been two commits (commit 1 and commit 2) that have happened since the base file 131 was formed. At a first commit (commit 1), the sparce file 132A is formed containing pages that have changed since commit 0, where each of those included pages are mapped to a page address in the page address range of the base file 131. At a second commit (commit 2), the sparce file 132B is formed containing pages that have changed since the first commit (commit 1), where each of those contained pages are also mapped to a page address in the page address range.

Since the data 130 changes relatively slowly, only a small fraction of the pages within the data 130 change from one commit to the next. Thus, although the sparce files 132 may technically be capable of including any page within the page address range of the data 130, the sparce files likely hold very few pages. Furthermore, since each included page is mapped to a corresponding page address within the page address range of the data 130, there is no need to utilize space to represent unchanged pages. Thus, the sparce files 132 may each be very small, perhaps even in the kilobyte range.

In some embodiments, it is possible that no pages at all changed from one commit to the next. In that case, there perhaps may be no pages contained within a sparce file. As an example, the data 130 may represent but characteristics of an even larger data to which the commit is applied. For instance, the data 130 might represent a dependency graph of a large codebase under development. The developers apply commits to the codebase. It is possible that even if the codebase changed from one commit to the next, that the dependencies themselves did not change. Thus, in that case, the sparce file corresponding to that commit would not contain any pages at all.

Since the sparce files 132 are each quite small, they can be quickly loaded into the memory of a computing system, and quickly formed and stored. As an example, in a write process, the base file 131 is not written to at all. Instead, during a commit, only a sparce file is created and stored. During a read process, only sparce files are loaded into memory, with perhaps some reading of individual pages from the base file 131. The base file 131 itself is not loaded into memory in its entirety.

Figure 2:
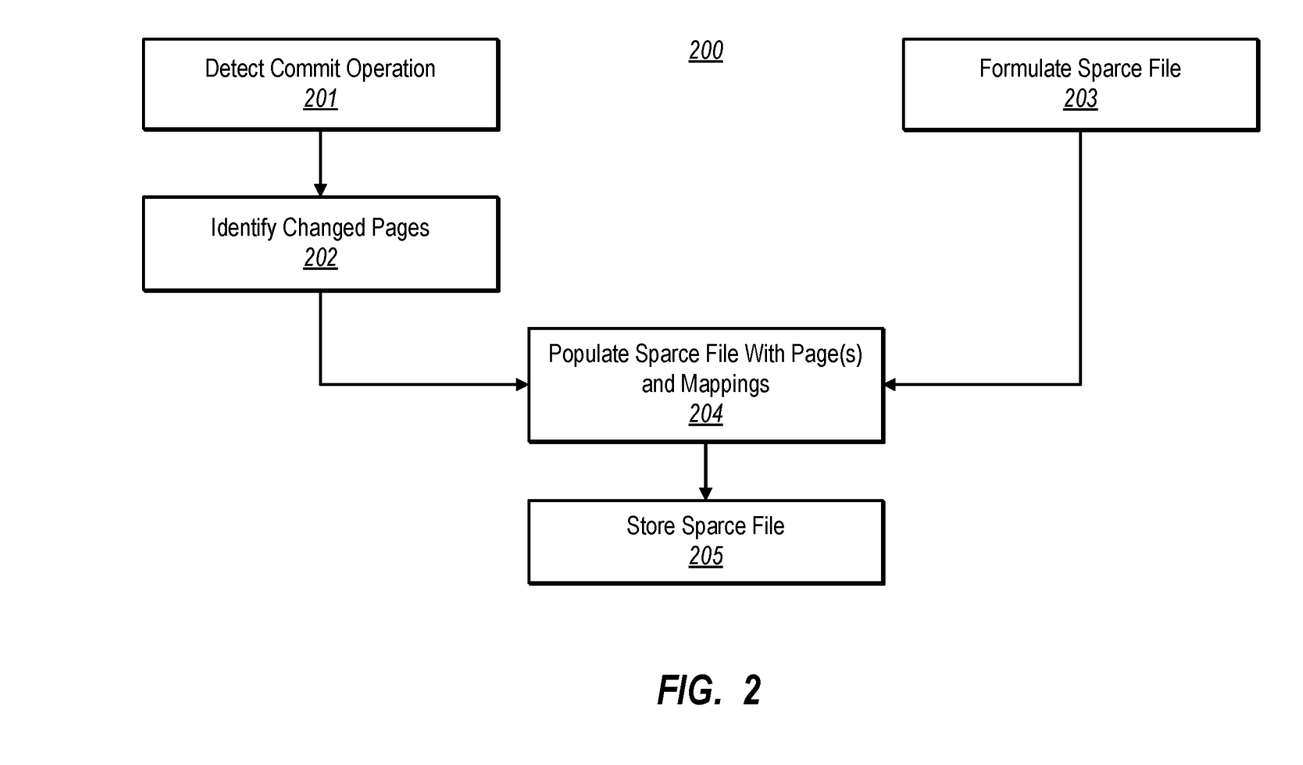
FIG. 2 illustrates a flowchart of a method for writing one or more pages to data, in accordance with the principles described herein.
Figure 3:
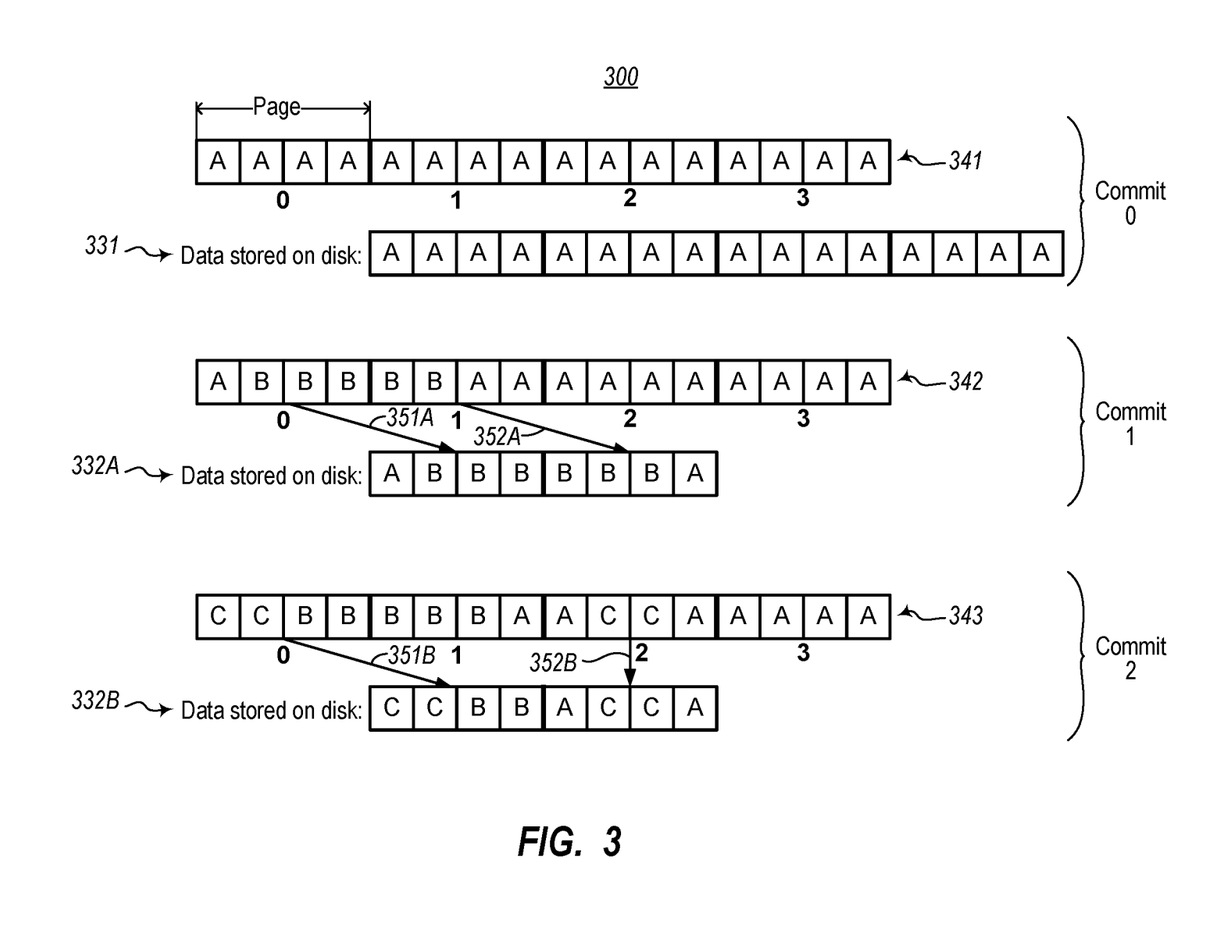
FIG. 3 illustrates an example data flow associated with the write operations resulting in the data of FIG. 1.

FIG. 2 illustrates a flowchart of a method 200 for writing one or more pages to data in accordance with the principles described herein. As an example, the writing may be accomplished using the write channel 101 of FIG. 1 in order to write one or more pages to the data 130 of FIG. 1. A specific example of the data and constituent pages involved in an example write is illustrated in FIG. 3. Accordingly, the method 200 for writing will now be described with frequent reference to the example environment 100 of FIG. 1 and to the example data 300 of FIG. 3.

Assume for now, that prior to the performance of the method 200, that the data 130 includes only the base file 131 as well as a single sparce file 132A, and that the method 200 as will now be described is being performed in order to formulate the second sparce file 132B. Furthermore, referring to FIG. 1, multiple write processes 110 are illustrated as capable of writing to the data 130. Write process 111 is expressly illustrated, but the ellipsis 116 represents that there may be any number, and perhaps countless, write processes using the write channel 101. Such might be the case where the data 130 is being generated as a result of a collaborative process.

As an example, if the data 130 is a dependency graph of a codebase, multiple developers may be concurrently working on that codebase, and the dependency graph may change as a result of each developer's efforts. There may even be write processes working in the background propagating changes made as a result of builds and commits that occurred some time ago. The write processes 110 need not be on the same computing system at all, but may even be widespread. Thus, the write channel 101 may be globally available to a large number of write processes.

For purpose of describing the method 200 with respect to generating the sparce file 132B, the write process 111 performs the write of one or more pages. To write, the write process 111 writes the pages (as represented by arrow 114) to an in-memory object 113 within the memory 112. The in-memory object 113 is visible to the write process as a representation of the entire data 130. From the write process 111 perspective, the write process 111 can write to any page within the data by writing to the in-memory object 113 (as represented by arrow 114). The method 200 may be performed by the in-memory object 113. The write process 111 and the in-memory object 113 may each be structured as described below for the executable component 706 of FIG. 7.

The method 200 is begun upon detecting a commit operation (act 201). As an example, the in-memory object 113 may detect that the write process 111 initiated a commit operation. This triggers the process of writing the changed pages to the data 130. In FIG. 1, for example, the in-memory object 113 will write the changed pages to the data 130 (as represented by the arrow 115).

The method 200 then includes identifying pages of the data that have changed since a prior commit in the sequence of commits (act 202). In FIG. 1, the in-memory object 113 has accumulated the pages that have been written by the write process 111. Thus, the object 113 may identify those pages as having been altered. The object 113 may include further intelligence to avoid including unnecessary pages within the sparce file.

As an example, a hash may be generated for each page to be written, each hash may be compared to pre-generated hashes for each corresponding page that exists in the data 130, including the pages in the data file 131 as well as in the sparce file 132A. If a matching hash is found, the object may potentially be able to eliminate writing that page. For instance, if the hash for a page having a particular page address is the same as a hash for a page in the prior sparce file (e.g., sparce file 132A in the example) where that page in the prior sparce file maps to the same particular page address, the page need not be included in a sparce file (e.g., sparce file 132B in the example) that will be generated for this new commit (commit 2 in the example). This is because the page did not really change since the last commit, but was merely read. As another example, if the hash for a page having a particular page address is the same as a hash for a page at the same particular page address in the base file, the page need not be included in the sparce file since that page has now the same content as was in the page in the base file, regardless of any changes made in the interim. In other words, although the page changes since an immediate prior commit in the sequence of commits, the page is the same as a page in a commit prior to that immediate prior commit.

Also, the method 200 includes formulating a sparce file for the commit (act 203). A sparce file may be created initially empty with each page being added as it is determined that the page has changed since the prior commit. Thus, the sparce file may be formulated even in advance of the commit operation, although that is not required. After all, the formulation of a sparce file is a fast operation. Since there really is no time dependency in when the sparce file is created, act 203 is shown in parallel with acts 201 and 202. The one or more pages are populated into the sparce file with the appropriate mapping to the page address (act 204).

The sparce file is then stored into the data (act 205). Referring to FIG. 2, the sparce file 132B was generated for commit 2 by the object 113, and populated with the pages that changed since the prior commit 1. The object 113 then writes the sparce file 132B into the storage 103, completing the write of the pages into the data 130.

While this example describes only the write process 111 as having made changes to the data 130 between commit 1 and commit 2, the object 113 may detect changes to the data made by any number of write processes, and write those changes as part of the sparce file 132B.

The method 200 may repeat for any number of write operations, resulting in layer after layer of sparce files stacked on the original base file. Over time, to avoid endless stacked sparce files, sparce files may be consolidated into a single sparce, or into a base file. As an example, sparce files 132A and 132B may be consolidated into a single sparce file, or the sparce file 132A may be consolidated into the base file 131 to form a new base file, or perhaps even all of the sparce files 132A and 132B may be consolidated into the base file 131 to form a new base file. The consolidation of one or more sparce files into a base file to form a new base file will also be referred to as "flattening" the data. There may be a schedule for flatting the layered files so as to avoid an unmanageable amount of sparce files.

FIG. 3 illustrates an example data flow 300 associated with the write operations resulting in the data 130 of FIG. 1. In this example, the data undergoes three sequential states, state 341 at commit 0 (the initial state), state 342 at commit 1, and state 343 at commit 2. The method 200 may have been performed once to obtain state 342 at commit 1, and again to obtain state 343 at commit 2. In this case, the data spans only four page addresses for purposes of simplicity and clarity, though data may typically have countless pages in the page address range for big data. The page addresses are labelled 0 to 3 from left to right.

In the first state, the data exists at state 341, and there is just a base file 331 in storage, the base file 331 representing an example of the base file 131 of FIG. 1. As a reminder, the base file 331 may be extremely large so as not to be entirely loadable into memory. A typical page can be several kilobytes in size. However, to keep the nomenclature simple, the content of each page is represented quartile by quartile. "A" represents the original state of the data as represented in the base file.

In the first performance of the method 200, the sparce file 332A is formed, representing an example of the first sparce file 132A of FIG. 1. Here, the state 342 of the data has changed from its original state. In particular, portions of page 0 and 1 have changed as represented by some of those pages now containing the letter B. The initiation of commit 1 is detected (act 201), the pages 0 and 1 are identified as having changed (act 202), the sparce file 332A is formed (act 203) and populated with the pages 0 and 1 mapped to the respective page addresses 0 and 1 (act 204), and the resulting sparce file 332A is stored (act 205).

The mappings are illustrated with arrows 351A and 352A. The pages contained within the sparce file 332A happen to be contiguous in the address space of the data 341. If that is the case, then the mapping may be represented as a pointer for the first page in the contiguous sequence of spaces along with a page length indicated. Thus, the mappings in the sparce file 332A may take the form of a pointer from the page 0 content to page address 0, along with a length indicator of 2. Alternatively, each page content may each have a dedicated pointer. Thus, the sparce file 332A could include page 0 content having its own pointer to page address 0, and page 1 content having its own pointer to page address 1.

In the second performance of the method 200, the sparce file 332B is formed, representing an example of the second sparce file 132B of FIG. 1. Here, the state 343 of the data has changed from its first changed state 342. In particular, portions of page 0 and 2 have changed as represented by some of those pages now containing the letter C. The initiation of commit 2 is detected (act 201), the pages 0 and 2 are identified as having changed (act 202), the sparce file 332B is formed (act 203) and populated with the pages 0 and 2 mapped to the respective page addresses 0 and 2 (act 204), and the resulting sparce file 332B is stored (act 205). The second sparce file 332B includes pages 0 and 2 that are discontiguous in the page address sparce of the data. Accordingly, here, two page address pointers 351B and 352B are used.

Figure 4:
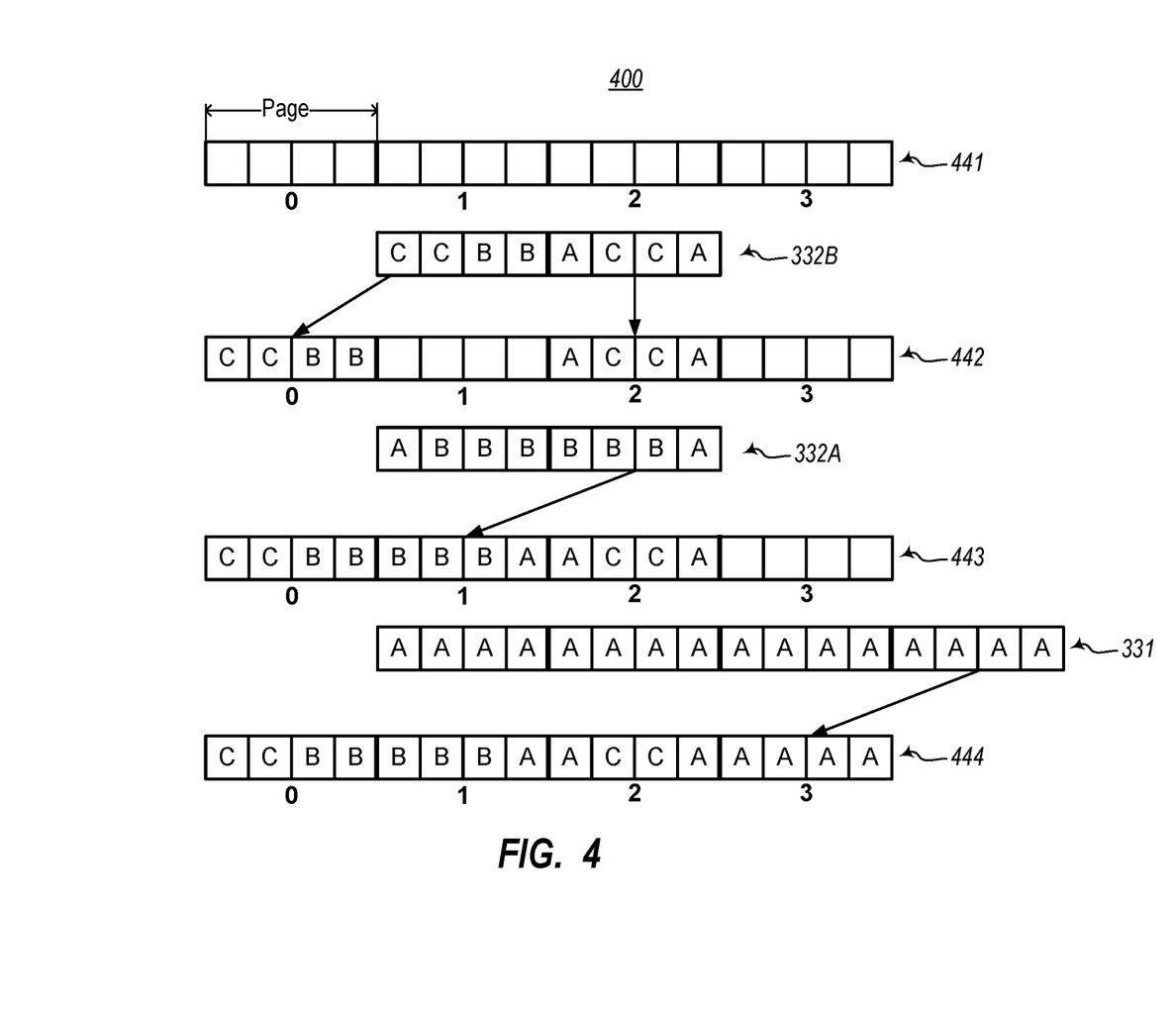
FIG. 4 illustrates example data structures associated with read operations from data of FIG. 1

An example read process will now be described with respect to FIG. 4, which illustrates various states 441, 442, 443 and 444 of an in-memory object. The in-memory object has the same page address range as the data. In initial state 441 of the in-memory object is empty. To read a page, the read navigates the sparce files 332 in reverse time order. The in-memory object is populated page-by-page only as the page is read.

As an example, suppose page 0 is the only page that is to be read. The sparce files 332B and 332A may each be loaded into memory, if they are not already in memory, as the sparce files 332B and 332A are quite small. The read navigates each sparce file in reverse time order beginning at the most recent sparce file 332B. And here, the read process finds a page that is mapped to page address corresponding to page 0, and thus page 0 is loaded into the in-memory object, and read by the read process.

As another example, suppose page 1 is the only page that is to be read. The sparce files 332B and 332A may each be loaded into memory, if they are not already in memory. The read navigates each sparce file in reverse time order beginning at the most recent sparce file 332B. There is no page mapping to page address 1 in the sparce file 332B, and thus the process continues to the next older sparce file 332A. There is a page that maps to page address 1 in sparce file 332A, and thus that content can then be read into the in-memory object, and read by the read process.

As another example, suppose page 2 is the only page that is to be read. The sparce files 332B and 332A may each be loaded into memory, if they are not already in memory. Sparce file 332B contains a page mapping to page address 2 in the sparce file 332B, and thus that content can then be read into the in-memory object, and read by the read process.

As the final example that involves the reading of a single page, suppose page 3 is the only page that is to be read. The read will check sparce files 332B and 332A in that order finding no page that maps to page address 3. Accordingly, in this case, the page at page address 3 is read from the base file 443, and populated into the in-memory object.

Now let's take an example in which two pages (pages 1 and 2) are to be read at the same time. The read process can populate each of the multiple pages with a single navigation in reverse order through the sparce files 332B and 332A and, if needed, also to the base file 331. The sparce files 332B and 332A may each be loaded into memory, if they are not already in memory. The sparce file 332B contains page 2, but not page 1, so page 2 is loaded into the in-memory object. Navigation proceeds then to the sparce object 332A, where page 1 is indeed found, and loaded into the in-memory object. All pages to be read have now been loaded into the in-memory object where they may be read at will. No reading from the base file 331 was required for this example.

Now let us take the case where four pages (pages 0, 1, 2 and 3) are read. The read process populates each of the multiple pages with a single navigation in reverse order through the sparce files 332B and 332A and finally to the base file 331. The sparce files 332B and 332A may each be loaded into memory, if they are not already in memory. The sparce file 332B contains pages 0 and 2, but not pages 1 and 3. So pages 0 and 2 are loaded into the in-memory object forming in-memory object state 442. Navigation proceeds then to the sparce object 332A. Of the remaining pages 1 and 3, the sparce object 332A contains page 1, but not page 3. So page 1 is loaded into the in-memory object forming in-memory object state 443. The sole remaining page 4 is then loaded from the base file 331 into the in-memory object resulting in the in-memory object state 444.

Figure 5:
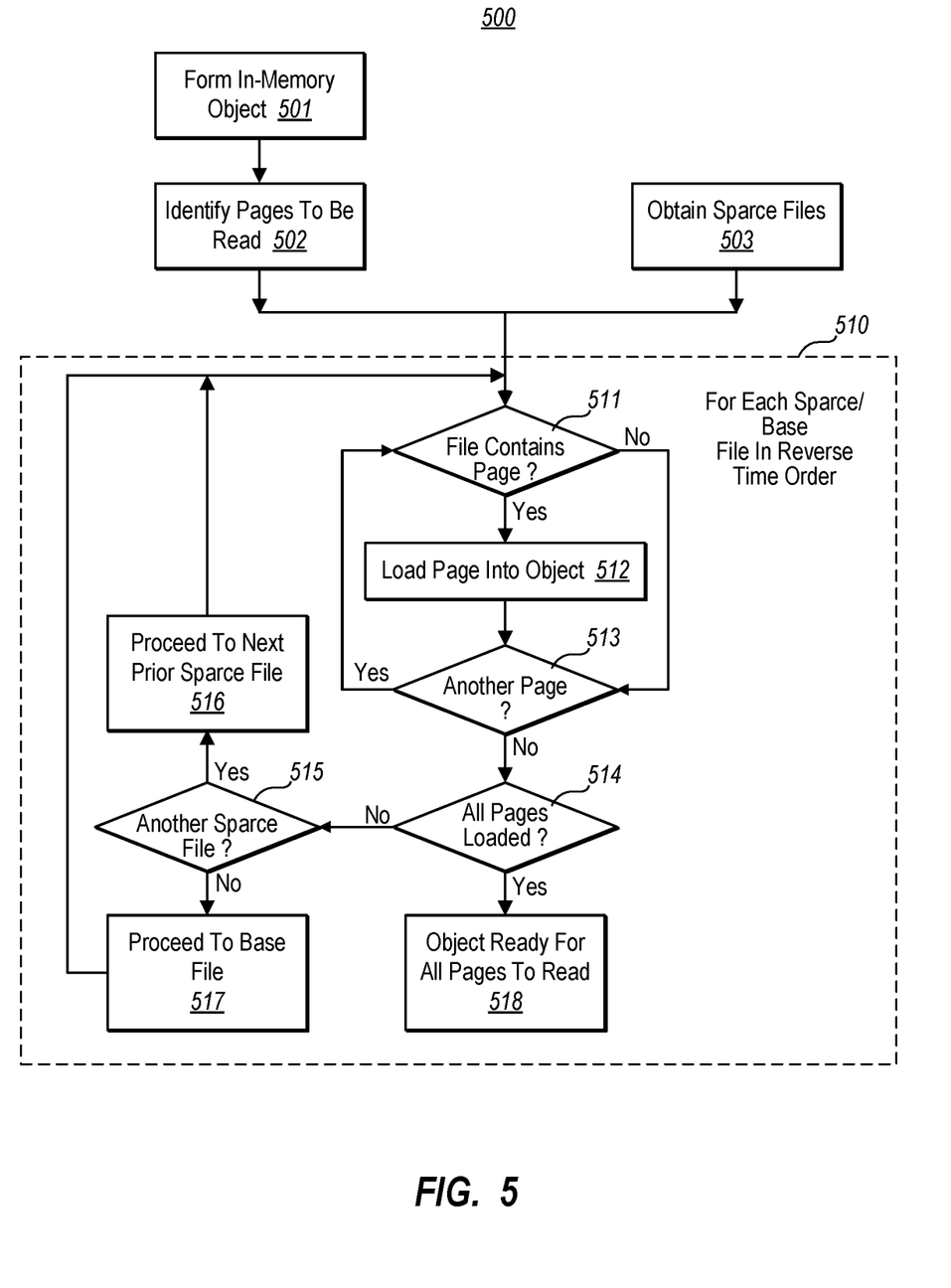
FIG. 5 illustrates a flowchart of a method for reading one or more pages of data, in accordance with the principles described herein.

FIG. 5 illustrates a flowchart of a method 500 for reading from data that spans a page address range, in accordance with the principles described herein. As an example, the writing may be accomplished using the read channel 102 of FIG. 1 in order to read one or more pages from the data 130 of FIG. 1. A specific example of the data and constituent pages involved in an example write is illustrated in FIG. 4. Accordingly, the method 500 for writing will now be described with frequent reference to the example environment 100 of FIG. 1 and to the example data structures 400 of FIG. 4.

Referring to FIG. 1, multiple read processes 120 are illustrated as capable of reading from the data 130. Read process 121 is expressly illustrated, but the ellipsis 126 represents that there may be any number, and perhaps countless read processes using the read channel 102.

The method 500 will be described frequently with respect to a specific example in which a read process 121 of FIG. 1 reads (as represented by arrow 124) pages from the data 130. An in-memory object 123 is visible to the read process as a representation of the entire data 130. The read process 121 is really reading from the in-memory object 123 stored in memory 122. The in-memory object 123 populates (as represented by arrow 125) the pages to be read in response to read requests from the read processes 120. The in-memory object 123 may also be capable of performing as the in-memory object in a write channel, much as already described with respect to the in-memory object 113 of FIG. 1.

The read channel 102 is composed of the in-memory object 123 which loads pages of data 130 from the storage 103, and response to the read request from the read processes 120 by providing the requested page. As described herein, this read process may be fast even though the in-memory object 123 does not include all of the data 130, but may be used to access any page of the data 130. The read process 121 and the in-memory object 123 may each be structured as described below for the executable component 706 of FIG. 7.

Referring now to FIG. 5, the method 500 includes formulating an in-memory object (act 501) that does not initially contain at least most of the pages of the data, but which is structured to be interpreted by a read process as including data of the page address range. Referring to FIG. 1, the in-memory object 123 is instantiated in the memory 122. The in-memory object 123 initially includes no pages at all. For instance, in FIG. 4, the in-memory object is illustrated as being empty in each of the page address 0 through 3. Referring to FIG. 1, the read process interprets the in-memory object 123 as including the data 130, even though the in-memory object 123 is initially empty.

The in-memory object 123 may have been instantiated well ahead of the performance of the rest of the method 500. Furthermore, the in-memory object 123 may perform the remainder of the method 500. Additionally, the in-memory object 123 may repeatedly perform the remainder of the method 500 for each of multiple read operations. In a first read operation that will now be described by way of example only, suppose that pages 1, 2 and 3 are to be read.

Referring again to FIG. 5, the method 500 also includes identifying one or more pages that are to be read from the data (act 502). In an example that will be described with respect to FIG. 4, pages 1, 2 and 3 are to be read as part of a read operation. The sparse files are also obtained (act 503). Referring to FIGS. 1 and 4, the in-memory object may load the sparse files 332A and 332B into memory 122, if they are not already in memory 122.

An evaluation 510 is then performed in reverse time order beginning with the most recent sparse file (e.g., sparse file 332B) and proceeding as and if needed to the next most recent sparse file (e.g., sparse file 332A), and so on and so forth, ending no further than the base file (e.g., base file 331).

For the current sparse file being evaluated, which since the method 500 has only just begun is the sparse file 332, the method 500 determines for each page to be read whether or not that page is within the sparse file. As a reminder, pages 1 through 3 are the pages to be read in the example first read operation.

Page 1 is not in the sparse file 332B ("No" in decision block 511), so the method 500 proceeds to determine whether there is another page to be searched for in the current sparse file (decision block 513). There is ("Yes" in decision block 513) since the method 500 has not yet determined whether page 2 of page 3 is in the sparse file 332B. Thus, the method 500 proceeds to determine whether the next page 2 is within the sparse file 332B.

Page 2 is in the sparse file 332B ("Yes" in decision block 511), so in-memory object loads page 2 into the in-memory object (act 512). At any point after this, the in-memory object 123 may provide page 2 to the read process 121 to respond to that portion of the read request. Alternatively, the in-memory object 123 could wait until all of the pages requested to be read are loaded within the in-memory object 123. The method 500 then proceeds to determine whether there is another page to be searched for the in the current sparse file (decision block 513). There is ("Yes" in decision block 513) since the method 500 has not yet determined whether page 3 of page 3 is in the sparse file 332B. Thus, the method 500 proceeds to determine whether the next page 3 is within the sparse file 332B.

Page 3 is not in the sparse file 332B ("No" in decision block 511), so the method 500 proceeds to determine whether there is another page to be searched for the in the current sparse file (decision block 513). There is not ("No" in decision block 513). Thus, the method 500 proceeds to determine whether or not all pages in the read operation have been loaded into the in-memory object (decision block 514). In the example, page 2 has been loaded from the sparse file 332B, but pages 1 and 3 have not yet been loaded ("No" in decision block 514) since they were not in the sparse file 332B. Accordingly, it is then determined whether there are more sparse files in reverse time order to be evaluated (decision block 515). There is one more; namely sparse file 332A ("Yes" in decision block 515). Accordingly, the evaluation proceeds to the next prior sparse file 332A (act 516) with the remaining pages to be loaded including page 1 and page 3.

Page 1 is in the sparse file 332A ("Yes" in decision block 511), so the in-memory object 123 loads page 1 into the in-memory object (act 512). At any point after this, the in-memory object 123 may provide page 1 to the read process 121 to respond to that portion of the read request. The method 500 then proceeds to determine whether there is another page to be searched for the in the current sparse file (decision block 513). There is ("Yes" in decision block 513) since the method 500 has not yet determined whether the next unloaded page 3 is in the sparse file 332A. Thus, the method 500 proceeds to determine whether the next page 3 is within the sparse file 332A.

Page 3 is not in the sparse file 332A ("No" in decision block 511), so the method 500 proceeds to determine whether there is another page to be searched for in the current sparse file (decision block 513). There are not ("No" in decision block 513). Thus, the method 500 proceeds to determine whether or not all pages in the read operation have been loaded into the in-memory object (decision block 514). In the example, pages 1 and 2 have been loaded from respective sparse files 332B and 332A. But page 3 has not yet been loaded ("No" in decision block 514) since page 3 was not in any sparse file evaluated thus far. Accordingly, it is then determined whether there are more sparse files in reverse time order to be evaluated (decision block 515). There are none since sparse file 332A was the first sparse file created ("No" in decision block 515). Accordingly, the evaluation proceeds to the base file 517 with the sole remaining page to be loaded being page 3.

Page 3 is in the base file ("Yes" in decision block 511). In fact, at this point any residual page that is yet to be loaded after having evaluated the sparse files will be present within the base file. Thus, the base file is the fall back. Accordingly, page 3 is loaded from the base file 331 into the in-memory object (act 512). There are no further pages to be searched for ("No" in decision block 513), and all pages requested to be read are now loaded into the in-memory object ("Yes" in decision block 514). Thus, the in-memory object is now ready for all of the requested pages to be read (act 518).

The read operation performed according to the method 500 of FIG. 5 is efficiently performed even for big data. After all, the sparse files are relatively small, especially for data that does not change much between commits relative to the size of the entirety of the data. Thus, the sparse files can be largely if not fully made available in memory. Many read operations might fully be satisfied by referring only to the sparse files, and never even touching the base file. Those read operations may be particularly fast. Even if the base file is read from, there is likely to be fewer pages needed from the base file. Thus, read operations occur very quickly.

Because the read operations are performed quickly, the data may be queried even where the query requires multiple and perhaps many read operations. Thus, the principles described herein make it feasible to query data that changes slowly over time, even where the data is massive. Thus, dependency graphs for large codebases may be queried each time a build of that codebase is performed, allowing the build to be performed with greater information about the dependencies of the complex codebase. Thus, builds are likely to be higher quality.

Figure 6:
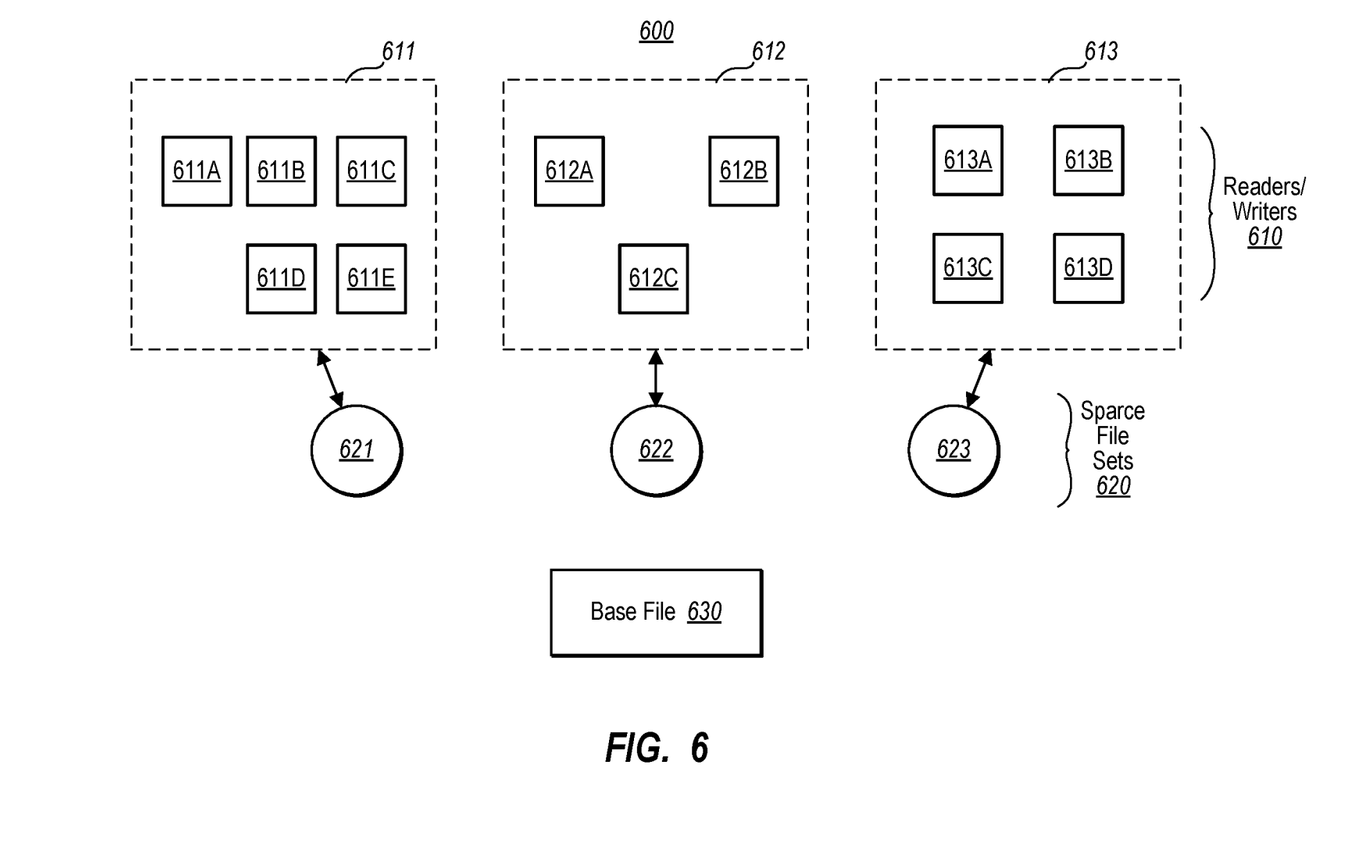
FIG. 6 illustrates an environment in which different sparce file sets will be relevant to different groups of read/write processes and/or different portions of the data.

FIG. 6 illustrates an environment in which different sparse file sets 620 layered on a single base file 630 will be relevant to different groups of read/write processes 610. As an example, if the data is a dependency graph for a large codebase, one team of developers may be interested in only one part of the data, another team of developers may be interested in only another part of the data, and so forth. Thus, sparce files may be created and layered upon only a portion of the data. Here, users 611 (comprising five users 611A through 611E) cause changes to a first portion of the data resulting in sparce file set 621, users 621 (comprising three users 612A through 612C) cause changes to a second portion of the data resulting in sparce file set 622, and users 613 (comprising four users 613A through 613D) cause changes to a third portion of the data resulting in sparce file set 623.

Alternatively, or in addition, the sparce file sets may be divided by the portion of the data being accessed. In the example in which the data is a dependency graph, the sparce file set 621 is for that portion of the dependency graph describing folder dependencies, sparce file set 622 is for that portion of the dependency graph describing file dependencies, and sparce file set 623 is for that portion of the dependency graph describing access dependencies. Thus, a single query may result in different sparce file sets being loaded depending on demands of the query processing.

Because the principles described herein are performed in the context of a computing system, some introductory discussion of a computing system will be described with respect to FIG. 7.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
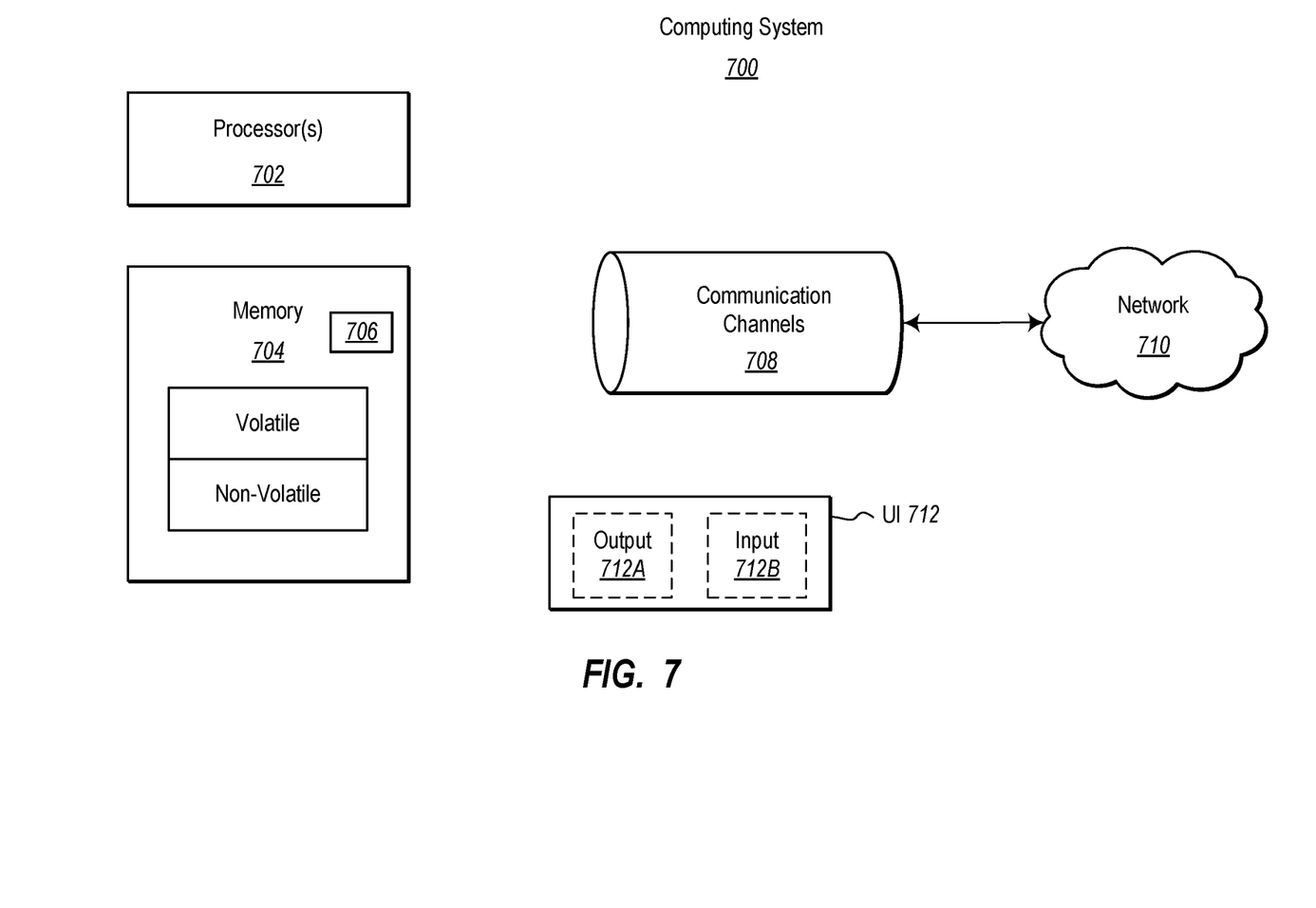
FIG. 7 illustrates an example computing system in which the principles described herein may be employed.

As illustrated in FIG. 7, in its most basic configuration, a computing system 700 includes at least one hardware processing unit 702 and memory 704. The processing unit 702 includes a general-purpose processor. Although not required, the processing unit 702 may also include a field programmable gate array (FPGA), an application specific integrated circuit (ASIC), or any other specialized circuit. In one embodiment, the memory 704 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 700 also has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, virtual or augmented reality, holograms and so forth. Examples of input mechanisms 712B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
one or more processors; and
one or more computer-readable media having thereon computer-executable instructions that are structured such that, if executed by the one or more processors, causes the computing system to read from data that spans a page address range by:
formulating an in-memory object that does not initially contain at least most of the pages of the data, but is structured to be interpreted by the read process as including data of the page address range; and identifying one or more pages that are to be read from the data, and for each of the one or more pages that are to be read from the data, performing a page read that comprises:

obtaining sparce files each corresponding to a respective commit in a sequence of commits of the data, each sparce file containing changed pages that changed since a prior commit in the sequence of commits and corresponding mapping of the changed pages to a page address in the page address range; and for each of the obtained sparce files, performing an evaluation in reverse time order beginning at a most recent sparce file representing a most recent commit in the sequence of commits, the evaluation comprising:

determining whether the corresponding sparce file contains the corresponding page;

if the corresponding sparce file does not contain the corresponding page, proceeding to the next sparce file to perform the evaluation; and if the corresponding sparce file does contain the corresponding page, loading the corresponding page from the corresponding sparce file into the in-memory object, and reading from the loaded page in the in-memory object.

2. The computing system in accordance with claim 1, the computer-executable instructions also being structured such that, if executed by the one or more processors, the evaluation in reverse time order further comprising the following for each residual page that is not contained in any of the obtained sparce files:

loading the residual page from a base file into the in-memory object, and reading the residual page from the in-memory object.

3. The computing system in accordance with claim 1, the data being a dependency graph of a codebase.

4. The computing system in accordance with claim 1, the computer-executable instructions also being structure such that, if executed by the one or more processors, the computing system is caused to process a query by:

processing a query request, the processing of the query request resulting in a sequence of reads from the data, each of the reads being performed by identifying one or more pages that are to be read from the data as part of the read, and performing the page read.

5. The computing system in accordance with claim 1, each of the pages represented in each sparce file being immutable such that any attempted change to a particular page is performed upon a further commit, by creating a subsequent sparce file and including in the subsequent sparce file a page representing changes to the particular page and that maps to a page address of the particular page.

6. A method for reading from data that spans a page address range, the method comprising:

formulating an in-memory object that does not initially contain at least most of the pages of the data, but is structured to be interpreted by the read process as including data of the page address range; and identifying one or more pages that are to be read from the data, and for each of the one or more pages that are to be read from the data, performing a page read that comprises:

obtaining sparce files each corresponding to a respective commit in a sequence of commits of the data, each sparce file containing changed pages that changed since a prior commit in the sequence of commits and corresponding mapping of the changed pages to a page address in the page address range; and for each of the obtained sparce files, performing an evaluation in reverse time order beginning at a most recent sparce file representing a most recent commit in the sequence of commits, the evaluation comprising:

determining whether the corresponding sparce file contains the corresponding page;

if the corresponding sparce file does not contain the corresponding page, proceeding to the next sparce file to perform the evaluation; and if the corresponding sparce file does contain the corresponding page, loading the corresponding page from the corresponding sparce file into the in-memory object, and reading from the loaded page in the in-memory object.

7. The method in accordance with claim 6, the evaluation in reverse time order further comprising the following for a residual page that is not contained in any of the obtained sparce files:

loading the residual page from a base file into the in-memory object, and reading the residual page from the in-memory object.

8. The method in accordance with claim 6, such that for at least one of the obtained sparce files, the pages contained within the sparce file are at not fully contiguous, but instead have a plurality of segments.

9. The method in accordance with claim 8, each segment having a single page or a plurality of contiguous pages.

10. The method in accordance with claim 9, each segment have an address pointer pointing to a page address in the page address range.

11. The method in accordance with claim 6, the data being a dependency graph of a codebase.

12. The method in accordance with claim 6, the data being weights and biases of a deep neural network.

13. The method in accordance with claim 6, the method for reading from the data being performed as part of query processing of a query request.

14. The computing system in accordance with claim 6, each of the pages represented in each sparce file being immutable such that any attempted change to a particular page is performed upon a further commit, by creating a subsequent sparce file and including in the subsequent sparce file a page representing changes to the particular page and that maps to a page address of the particular page.

15. The method in accordance with claim 14, the method for reading from the data being performed as part of a concurrent read by a plurality of processes of the obtained sparce files.

16. A computing system comprising:

one or more processors; and one or more computer-readable media having thereon computer-executable instructions that are structured such that, if executed by the one or more processors, the computing system formulates a representation of commits of data that spans a page address range by:

for each of a sequence of commits of the data by, 1) identifying pages of the data that have changed since a prior commit in the sequence of commits; 2) formulating a sparce file containing each of identified page, and for each identified page a mapping of the identified to a page address of the identified page in the address range; and 3) storing the sparce file as associated with the corresponding commit.

17. The computing system in accordance with claim 16, the data representing characteristics of a codebase.

18. The computing system in accordance with claim 17, at least one of the sparce files not containing any pages at all because the characteristics of the codebase did not change between commits.

19. The computing system in accordance with claim 16, the data representing a dependency graph of a codebase.

20. The computing system in accordance with claim 16, the identifying of pages of data that have changed excluding a page that changed since an immediate prior commit in the sequence of commits, but which is the same as a page in a commit prior to that immediate prior commit.

\* \* \* \* \*